(12) United States Patent
Pline

(10) Patent No.: US 7,641,019 B2
(45) Date of Patent: Jan. 5, 2010

(54) JOYSTICK POSITIONING MECHANISM

(75) Inventor: Jason M. Pline, Dubuque, IA (US)

(73) Assignee: Deere & Company, Moline, IL (US)

( * ) Notice: Subject to any disclaimer, the term of this patent is extended or adjusted under 35 U.S.C. 154(b) by 146 days.

(21) Appl. No.: 11/855,744

(22) Filed: Sep. 14, 2007

(65) Prior Publication Data
US 2009/0071742 A1 Mar. 19, 2009

(51) Int. Cl.
B60K 26/00 (2006.01)
G05G 9/047 (2006.01)
(52) U.S. Cl. .................. 180/315; 74/471 XY
(58) Field of Classification Search .......... 180/315, 180/326, 329, 331, 333, 334, 335, 336; 74/471 XY
See application file for complete search history.

(56) References Cited

U.S. PATENT DOCUMENTS 5,450,054 A * 9/1995 Schmersal .................. 338/128
6,213,244 B1 * 4/2001 Waggoner et al. ........... 180/333
6,564,896 B1 * 5/2003 Proksch et al. .............. 180/326
6,722,224 B2 * 4/2004 Nordstrom ............. 74/471 XY

* cited by examiner

Primary Examiner—Ruth Ilan
Assistant Examiner—Keith Frisby
(74) Attorney, Agent, or Firm—Taylor & Aust, P.C.

(57) ABSTRACT

A ground engaging vehicle having a frame, a power unit connected to the frame, at least one ground traction device, a power transfer device directing power from the power unit to the at least one ground traction device. The control system controls the power transfer device. An input device accepts commands from an operator and provides a signal to the control system. The input device includes a first bracket, a second bracket pivotally connected to the first bracket and a joystick device connected to the first bracket.

17 Claims, 4 Drawing Sheets

JOYSTICK POSITIONING MECHANISM

BACKGROUND OF THE INVENTION

1. Field of the Invention

The present invention relates to a joystick, and, more particularly, to a joystick for controlling a ground engaging vehicle.

2. Description of the Related Art

Various methods have been used for the steering of vehicles such as controlling the direction and application of power to vehicle wheels. For controlling animal pulled vehicles a rein system was devised in which the desired direction and speed of the animal is conveyed to the animal using reins attached to the halter and/or bit system. It is known to use steering wheels to control the direction of vehicles, such as cars. The rotation of the steering wheel causes a pivoting of wheels that are steered to thereby cause a change in direction of the vehicle. Clutches and/or brakes activated by two levers have been utilized to control each side of a tracked vehicle, allowing the combination of the positioning of the levers to independently control the driven tracks located on each side of the vehicle. This allows one side of the vehicle to be driven forward while the other side is being driven backward to quickly turn the tracked vehicle.

Joysticks are utilized to steer aircraft by having the joystick to control two of the steering systems, which are the elevator and the ailerons. Joysticks have also been utilized to control the steering of lawnmowers and other ground engaging vehicles. The joystick controls the steering and/or drive controls to thereby provide for the application of power and/or steer wheels to alter the direction of the vehicle.

What is needed in the art is a joystick positioning mechanism that is economical to produce and reliable.

SUMMARY OF THE INVENTION

The present invention includes a ground engaging vehicle having a frame, a power unit connected to the frame, at least one ground traction device, a power transfer device directing power from the power unit to the at least one ground traction device. The control system controls the power transfer device. An input device accepts commands from an operator and provides a signal to the control system. The input device includes a first bracket, a second bracket pivotally connected to the first bracket and a joystick device connected to the first bracket.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, in one form, and such exemplifications are not to be construed as limiting the scope of the invention in any manner.

DETAILED DESCRIPTION OF THE INVENTION

Figure 1:
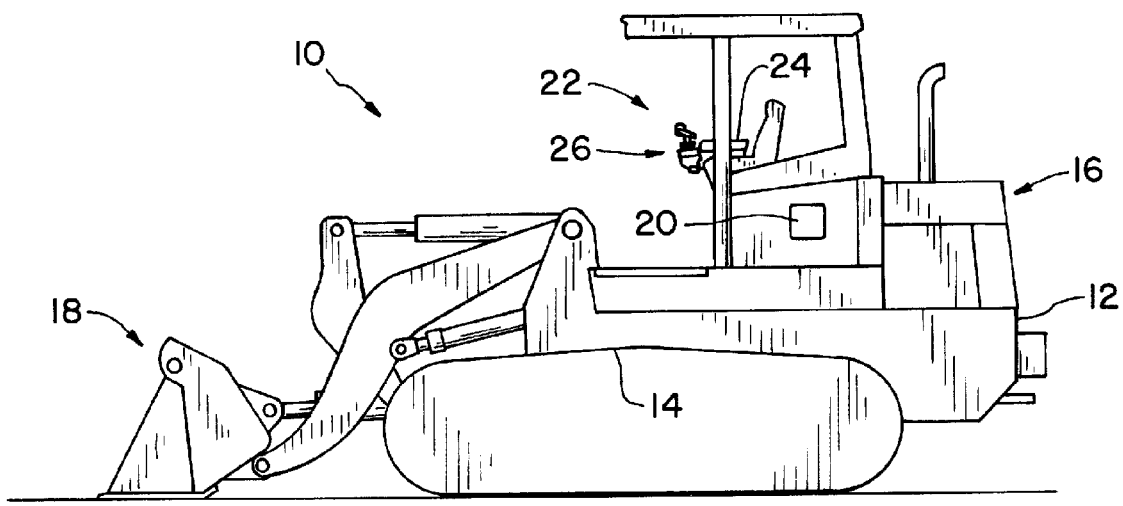
FIG. 1 is a side view of a crawler/loader utilizing an embodiment of a joystick positioning mechanism of the present invention.

Referring now to the drawings, and more particularly to FIG. 1, there is shown a crawler/loader 10, also known as ground engaging vehicle 10. Crawler/loader 10 includes a frame 12, a track 14, an engine 16, a loader 18, a control system 20 and a seating system 22. Frame 12 provides structural rigidity to crawler/loader 10 and has engine 16 mounted thereon. Tracks 14 provide traction to the ground and are driven by power from engine 16, which also includes a power transfer device otherwise known as a transmission. The transmission is under the control of control system 20. Loader 18 is positioned by way of control system 20 and allows for movement and relocation of earth that is scooped into its bucket.

Seating system 22 includes a seat in which an operator sits and the seat has an arm rest 24 with control input device 26 attached thereto. Control input device 26 is in communication with control system 20 and positioning information from control input device 26 is transferred to control system 20 to interpret the commands from the operator relative to the speed, direction and steering commands, among others. While it is contemplated that more than one control input device can provide signals to control system 20, for ease of understanding only control input device 26 and the commands therefrom are discussed hereinafter.

Figure 2:
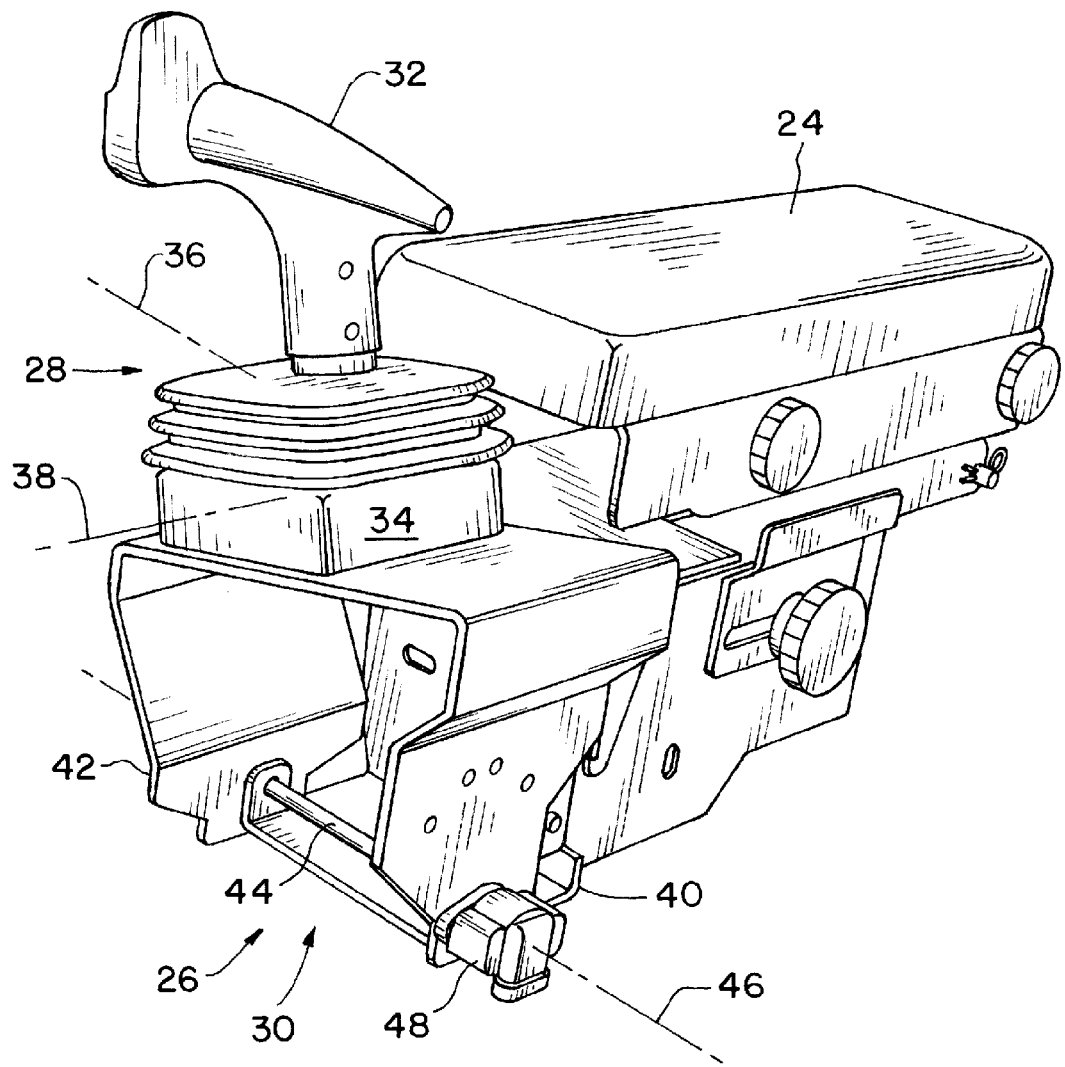
FIG. 2 is a perspective view of the joystick positioning mechanism used in FIG. 1.
Figure 3:
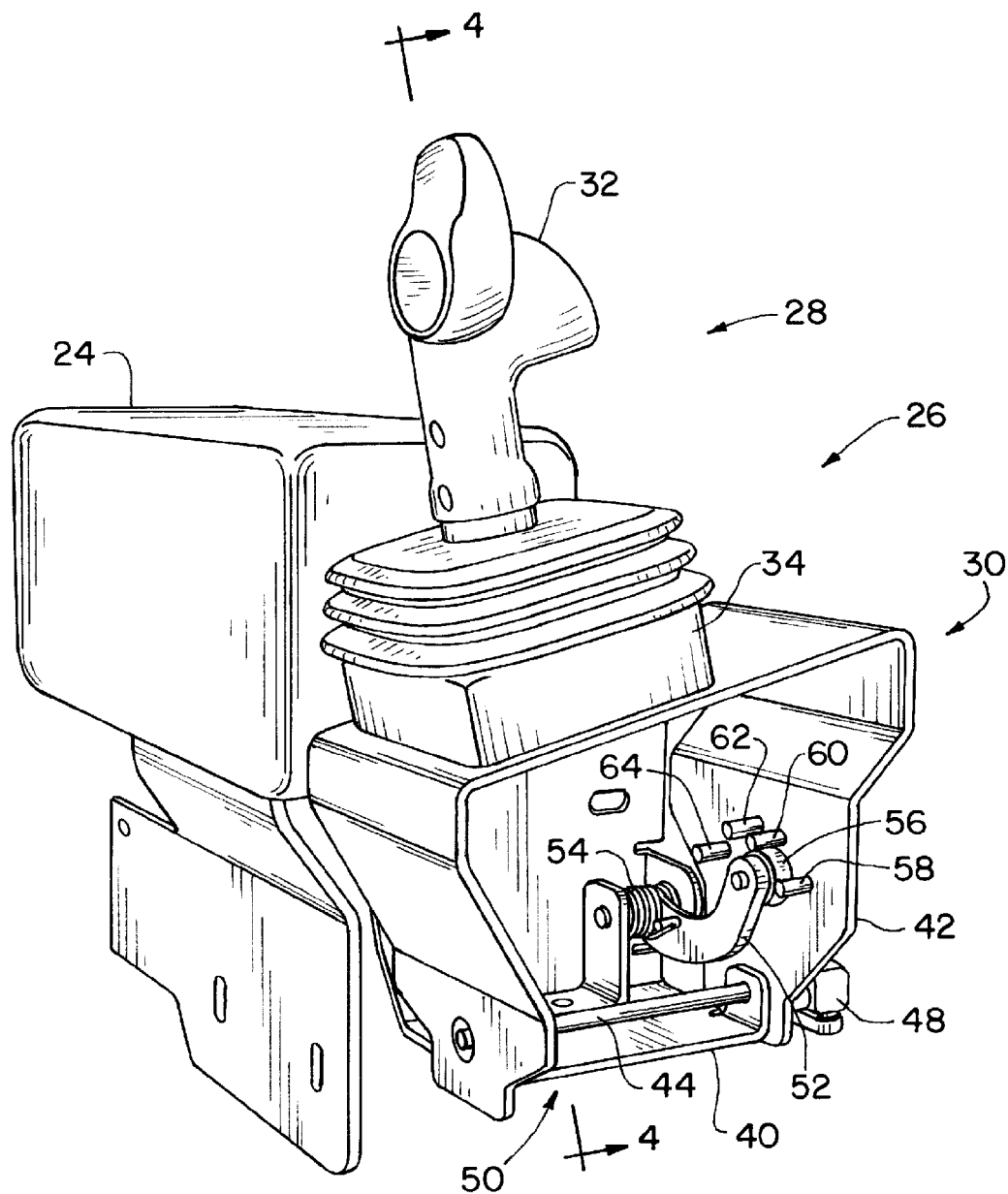
FIG. 3 is another perspective view of the joystick positioning mechanism of FIGS. 1 and 2.
Figure 4:
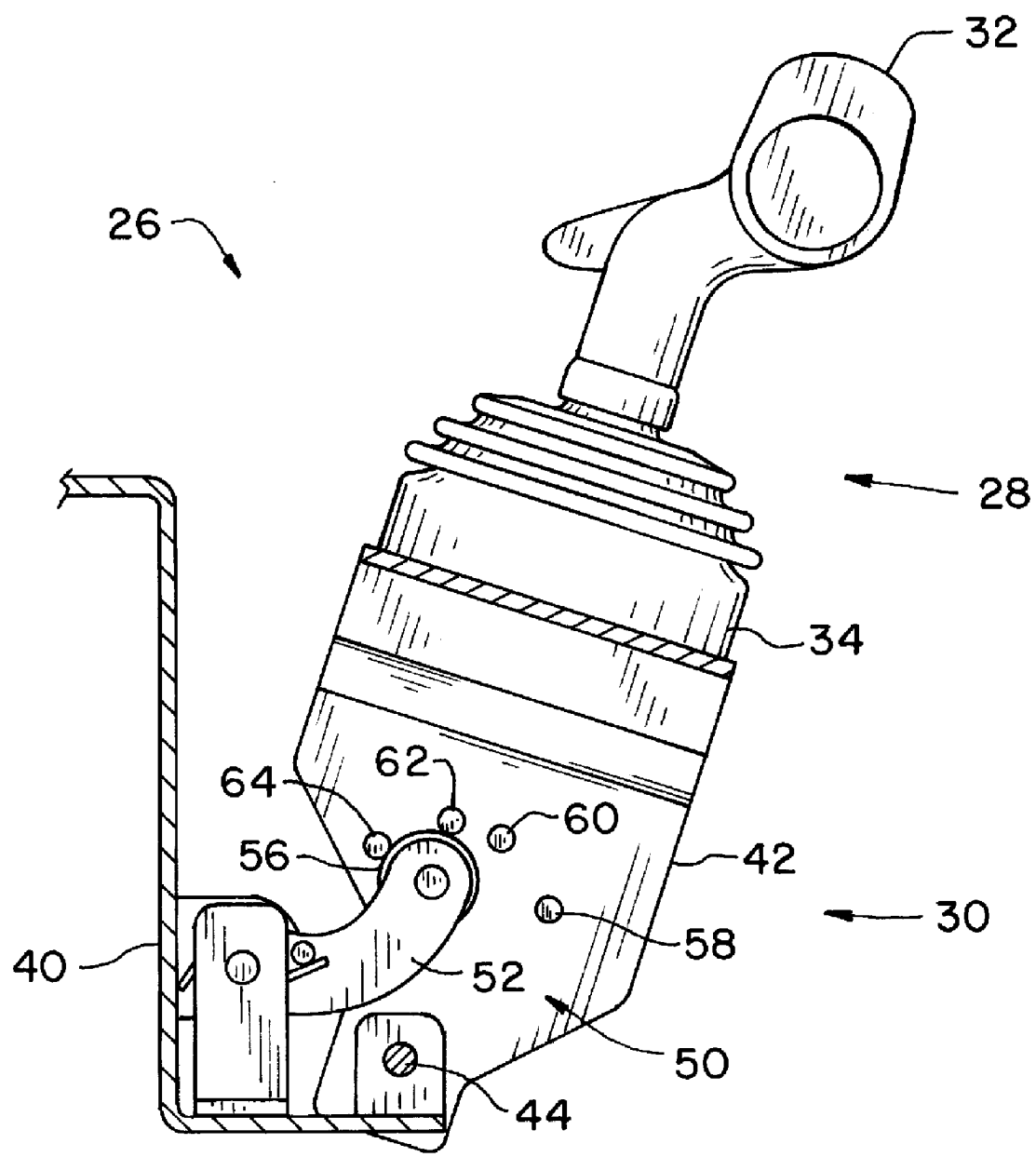
FIG. 4 is a partially sectioned side view taken along axis 4-4 of the joystick positioning mechanism of FIGS. 1-3.

Now additionally referring to FIGS. 2-4, there is illustrated a control input device 26 includes a joystick portion 28 and a pivotal portion 30. Joystick portion 28 includes a handle 32 connected to a base 34. Handle 32 is pivotable about axis 38 relative to base 34; however handle 32 is locked from pivoting about axis 36 allowing joystick portion 28 to provide side to side steering information to control system 20 as joystick portion 28 is pivoted about axis 38.

Pivotal portion 30 includes a bracket 40, a bracket 42, a rod 44, a position sensor 48 and a positioning device 50. Bracket 40 is connected to arm rest 24 or to the structure to which arm rest 24 is connected. For purposes of this discussion, and for ease of understanding, bracket 40 will be considered immovable relative to joystick portion 28 and bracket 42. Bracket 42 is pivotally connected to bracket 40 by way of rod 44 about an axis 46. When the operator moves handle 32 forward or backward, this causes the repositioning of bracket 42 relative to bracket 40, which is detected by way of position sensor 48 that provides a signal to control system 20 indicating the position of bracket 42 relative to bracket 40. Bracket 40 includes two bent or formed ears through which rod 44 extends and is in close proximity to parts of bracket 42 having rod 44 extend through two parts of bracket 40 and through two parts of bracket 42 thereby allowing movement of bracket 42 relative to bracket 40 only about axis 46.

Position sensor 48 is connected to or is proximate to bracket 42 and detects the rotatable position of bracket 42 relative to bracket 40. Position sensor 48 may detect the relative position of bracket 42 to bracket 40 by providing an angular measurement of the relative position that is then interpreted by control system 20, or position sensor 48 may simply have three output signals that indicate one of the three detented positions of bracket 42 relative to bracket 40.

Positioning device 50 includes an arm 52, a spring 54 and a roller 56. Protrusions 58, 60, 62 and 64 extend from a surface of bracket 42 and interact with positioning device 50. Protrusions 58, 60, 62 and 64 can be considered pins 58, 60, 62 and 64 that extend from an inner surface of bracket 42 and interact with roller 56 of positioning device 50. Arm 52 is pivotally connected to a portion of bracket 40 and is biased by spring 54 away from axis 46. Roller 56 is rotatably attached to the end of arm 52 opposite its pivotal connection to bracket 40. Roller 56 encounters one or two of pins 58, 60, 62 and 64 at any one time. The interaction of positioning device 50 with pins 58-64 provide three detented positions of bracket 42 relative to bracket 40. Pins 58-64 are generally equidistant from axis 46 and may be equally spaced or spaced differently to provide separate intensities of a detent.

In operation control input device 26 provides for movement about an axis 46 of most of control input device 26. Sideways movement about axis 38 is undertook by a movement of handle 32 in a sidewise direction to provide a signal to control system 20 that may be interpreted as a steering command to be utilized in the control of crawler/loader 10. Axis 36 is substantially parallel with axis 46 and any movement of handle 32 in a forward direction causes control input device 26 to rotate about axis 46. Side to side movement of handle 42 causes movement of just handle 32 about axis 38. This provides various control applications, for example, the positioning of bracket 42 relative to bracket 40 can be thought of as a speed direction selection device. When bracket 42 is pushed forward about axis 46 roller 56 is then positioned between pins 62 and 64 and position sensor 48 provides a signal to the control system 20 to indicate that a forward direction of crawler/loader 10 has been selected. The actual speed of crawler/loader 10 in the selected direction is undertaken by a separate control, which may include a foot throttle, a hand throttle or other speed selection apparatus. Conversely when bracket 42 is rotated backwards so that roller 56 is between pins 58 and 60, a reverse direction is interpreted by control system 20 from the signal sent by way of positioning sensor 48. When roller 56 is between pins 60 and 62 a neutral position is established and engine 16 may be disengaged from providing any power to track 14.

Mechanical stops for the positioning of bracket 42 relative to bracket 40 are utilized, but not shown, for the purposes of clarity. Mechanical stops prevent the rotation of bracket 42 about axis 46 that would cause roller 56 to extend beyond pin 58 or beyond pin 64. The detent positions, which positioning device 50 establish, remain engaged until the operator moves handle 32 causing pivotal portion 30 to be positioned in one of the three detented positions.

Although not shown, joystick portion 28 may include other input devices such as roller wheels, a trigger or other mechanisms that provide other control features for the control of crawler/loader 10. As discussed herein, the traction device was illustrated as a track 14 although wheels or other ground engaging mechanisms are also contemplated to be utilized by ground engaging vehicle 10. Control input device 26 allows for the combination of forward/reverse direction selection and steering in an economical, reliable, mechanism that can intuitively be utilized by an operator in the operation of crawler/loader 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A ground engaging vehicle, comprising:
    a frame;
    a power unit connected to said frame;
    at least one ground traction device;
    a power transfer device directing power from said power unit to said at least one ground traction device;
    a control system controlling said power transfer device; and
    an input device accepting commands from an operator and providing a signal to said control system, said input device including:
        a first bracket;
        a second bracket pivotally connected to said first bracket about a pivot axis;
        a joystick device connected to said first bracket, said joystick device being pivotable about a joystick axis, said pivot axis and said joystick axis not intersecting;
        a plurality of protrusions extending from one of said first bracket and said second bracket; and
        a biased member extending from one of said first bracket and said second bracket, said biased member interacting with said protrusions to provide a plurality of detented positions about said pivot axis of said first bracket relative to said second bracket.

2. The ground engaging vehicle of claim 1, further comprising a seating system, said second bracket being attached to a portion of said seating system.

3. The ground engaging vehicle of claim 2, wherein said input device further includes at least one sensor detecting which one of said plurality of detented positions said first bracket is positioned relative to said second bracket.

4. The ground engaging vehicle of claim 3, wherein said at least one sensor is a rotational position sensor configured to detect angular positions of said first bracket relative to said second bracket about said pivot axis, said angular positions relating to corresponding ones of said plurality of detented positions.

5. The ground engaging vehicle of claim 4, wherein said rotational position sensor produces a signal used by said control system indicating a selection by the operator of one of a forward direction, a neutral position and a reverse direction.

6. A ground engaging vehicle, comprising:
    a frame;
    a power unit connected to said frame;
    at least one ground traction device;
    a power transfer device directing power from said power unit to said at least one ground traction device;
    a control system controlling said power transfer device; and
    an input device accepting commands from an operator and providing a signal to said control system, said input device including:
        a first bracket;
        a second bracket pivotally connected to said first bracket about a pivot axis; and
        a joystick device connected to said first bracket, said joystick device being pivotable about a joystick axis, said pivot axis and said joystick axis not intersecting, said joystick being locked from motion about an other joystick axis, said pivot axis and said other joystick axis being substantially parallel.

7. The ground engaging vehicle of claim 6, wherein said joystick axis is substantially perpendicular to said pivot axis.

8. The ground engaging vehicle of claim 7, wherein said input device further includes:

a plurality of protrusions extending from one of said first bracket and said second bracket; and a biased member extending from one of said first bracket and said second bracket, said biased member interacting with said protrusions to provide a plurality of detented positions about said second axis.

9. The ground engaging vehicle of claim 8, further comprising a seating system, said second bracket being attached to a portion of said seating system.

10. The ground engaging vehicle of claim 8, wherein said input device further includes a rolling member rotatably attached to an end of said biased member, said rolling member in rolling contact with at least one of said plurality of protrusions.

11. An input device for use with a ground engaging vehicle, the input device comprising:

an input device accepting commands from an operator, said input device including:

a first bracket;

a second bracket pivotally connected to said first bracket about a pivot axis;

a joystick device connected to said first bracket, said joystick device being pivotable about a joystick axis, said pivot axis and said joystick axis not intersecting;

a plurality of protrusions extending from one of said first bracket and said second bracket; and a biased member extending from one of said first bracket and said second bracket, said biased member interacting with said protrusions to provide a plurality of detented positions about said pivot axis of said first bracket relative to said second bracket.

12. The input device of claim 11, wherein said input device further includes at least one sensor detecting which one of said plurality of detented positions said first bracket is positioned relative to said second bracket.

13. The input device of claim 12, wherein said at least one sensor is a rotational position sensor configured to detect angular positions of said first bracket relative to said second bracket about said pivot axis, said angular positions relating to corresponding ones of said plurality of detented positions.

14. The input device of claim 13, wherein said rotational position sensor produces a signal that contains information regarding a selection by the operator of one of a forward direction, a neutral position and a reverse direction.

15. The input device of claim 11, wherein said joystick is locked from motion about an other joystick axis, said pivot axis and said second other joystick axis being substantially parallel.

16. The input device of claim 15, wherein said joystick is pivotable about a third axis, said joystick axis is substantially perpendicular to said pivot axis.

17. The input device of claim 16, wherein said input device further includes a rolling member rotatably attached to an end of said biased member, said rolling member in rolling contact with at least one of said plurality of protrusions.

* * * * *